United States Patent [19]

Nakamura

[11] 4,407,577

[45] Oct. 4, 1983

[54] AUTOLOADING APPARATUS FOR PHOTOGRAPHIC FILM

[75] Inventor: Ikushi Nakamura, Sakai, Japan

[73] Assignee: Minolta Camera Kabushiki Kaisha, Toyonaka, Japan

[21] Appl. No.: 337,225

[22] Filed: Jan. 5, 1982

[30] Foreign Application Priority Data

Jan. 8, 1981 [JP] Japan ................................. 56-1761

[51] Int. Cl.³ .............................................. G03B 1/12
[52] U.S. Cl. ................................................. 354/173
[58] Field of Search ............................... 354/173, 212

[56] References Cited

U.S. PATENT DOCUMENTS 3,589,637  6/1971  Wagner .............................. 242/71.1
4,281,911  8/1981  Engelsmann et al. ............... 354/173
4,297,019  10/1981  Yagi et al. ...................... 354/173 X
4,342,509  8/1982  Wakabayashi et al. ............. 354/173

FOREIGN PATENT DOCUMENTS 1114379  9/1961  Fed. Rep. of Germany ...... 354/212

Primary Examiner—John Gonzales
Attorney, Agent, or Firm—Wolder, Gross & Yavner

[57] ABSTRACT

An autoloading apparatus comprising a take-up spool for winding a film thereon, a film transport member for transporting the film to the take-up spool, a motor for driving the spool and the transport member, a first detecting member for energizing the motor to start automatic film transport upon detecting the insertion of the film into a film inlet, and a second detecting member for de-energizing the motor to stop the transport upon detecting that the film has been wound on the spool. The apparatus enables the user to close the camera back after recognizing that the film has been properly wound on the spool and reduces the amount of film to be wasted for loading.

6 Claims, 7 Drawing Figures

AUTOLOADING APPARATUS FOR PHOTOGRAPHIC FILM

BACKGROUND OF THE INVENTION

1. Field of the Invention

The present invention relates to an autoloading apparatus for automatically winding a film on a spool when the film is to be loaded into a still camera.

2. Description of the Prior Art

An apparatus is known for automatically loading a film into a camera by placing the cartridge in position, pulling out a short length of the film, engaging film perforations with a sprocket and closing the camera back. When the camera back is closed, the sprocket and a spool are driven by a motor to start film transport, and the film is stopped when the first frame is brought to the exposure position (Published Unexamined Japanese Patent Application No. 28087/1980).

However, since the apparatus is so adapted that the sprocket and the spool are driven upon the closing of the camera back even if the film perforations are disengaged from the sprocket, it is likely that the user fails to recognize the misloading. Further since the film has not been tensioned in a fixed position when the camera back is to be closed, the cartridge is not always held in place but tends to rotate owing to the slack or curl of the film, consequently making it difficult to close the camera back.

On the other hand, U.S. Pat. No. 3,589,637 discloses a manual loading apparatus. With this apparatus, the cartridge is set in position, the leading end of the film is then pulled out and inserted into a spool chamber, and the film winding mechanism is thereafter operated, whereby the film is advanced into the spool chamber and wound onto the spool. Upon observing this film take-up action, the user closes the camera back and further advances the film for idle transport. This apparatus assures reliable loading because the camera back is closed after the film take-up action has been observed. However, since the film is inserted into the spool chamber without restraint, there is the tendency that the length of film placed into the spool chamber is generally larger than is needed. Further, because a considerable length of film is wound up with the camera back left open for the recognition of the film transport, a large amount of film will be wasted.

SUMMARY OF THE INVENTION

The main object of this invention is to provide an apparatus for automatically loading a film into a camera which enables the user to close the camera back after recognizing that the film has been wound on a spool and which reduces the amount of film wasted.

The autoloading apparatus of the present invention is characterized by first detecting means for detecting the insertion of a film into a film inlet to initiate automatic transport of such film upon the detection and by second detecting means for detecting the winding of the film on a spool to stop the automatic transport upon detecting the winding.

DESCRIPTION OF THE PREFERRED EMBODIMENTS

Embodiments of the present invention will be described below with reference to the drawings.

Figure 1:
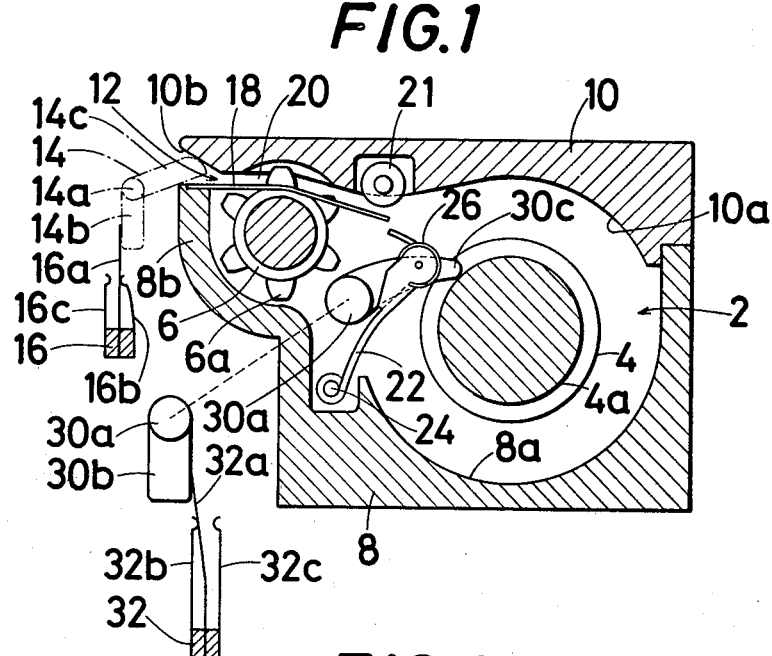
FIGS. 1 and 2 are fragmentary sectional views of an embodiment of the invention to showing the upper portion of a spool chamber as it is seen from below.
Figure 2:
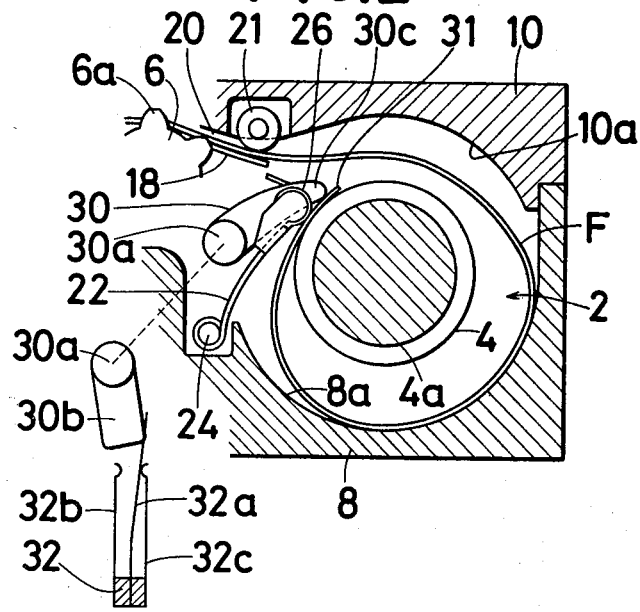

FIGS. 1 and 2 are sectional views showing the upper portion of a spool chamber 2 and its vicinity as the chamber is seen from below. A spool 4 and a sprocket 6 are rotatably supported by a camera body 8 and driven by a motor through the power transmission mechanism to be described later. A cover 10 attached to the body 8 has a wall 10a which defines the spool chamber 2 along with a wall 8a of the body. The cover 10 is formed, at the left end shown, with a slanting surface 10b which defines a film inlet 12 along with an end portion 8b of the body 8.

A first film detecting lever 14 indicated in dot-and-dash lines in FIG. 1 has a pivot 14a rotatably mounted on a lower portion of the body 8 and an operating arm 14b in resilient contact with a movable contact piece 16a of a switch 16 and biased counterclockwise in FIG. 1. The lever 14 has a detecting arm 14c extending into the film inlet 12. The forward end of the arm 14c bears against the slanting surface 10b of the cover and is adapted to come into contact with the leading end of the film to be inserted into the inlet 12. The switch 16 comprises the movable contact piece 16a and fixed contact pieces 16b, 16c arranged on the opposite sides of the piece 16a. With its resiliency, the movable piece 16a usually biases the operating arm 14b of the first detecting lever 14 counterclockwise as mentioned above and is in contact with the fixed piece 16b.

Figure 3A:
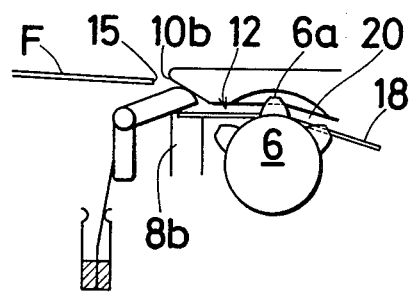
FIGS. 3 (a) and (b) are fragmentary bottom views of the embodiment illustrating the operation of a first film detecting member.
Figure 3B:
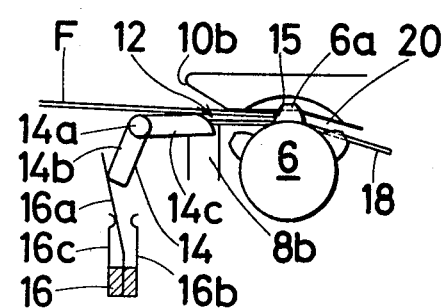

FIGS. 3 (a) and (b) are bottom views showing the first detecting lever 14 in operation. When a film F in FIG. 3 (a) is inserted into the inlet 12, the detecting arm 14c of the lever 14 is pushed by the leading end 15 of the film F, so that the movable contact piece 16a is separated from the fixed contact piece 16b and brought into contact with the fixed contact piece 16c by the operating arm 14b against the resilient force of the piece 16a as seen in FIG. 3 (b).

A guide plate 18 has one end fixed to the end portion 8b of the body 8 and extends between the upper and lower teeth 6a of the sprocket 6 to define a path 20 for guiding the film along with the inner surface of the wall 10a of the cover 10. A roller 21 is rotatably mounted on the wall 10a of the cover 10 and projects into the guide path 20 in the vicinity of its outlet.

A movable guide plate 22 is turnably mounted on a pin 24 implanted in the body 8 and is biased clockwise in FIG. 1 by an unillustrated spring. At its forward end, the guide plate 22 rotatably carries a guide roller 26 in resilient contact with a side portion of the spool 4.

After passing through the guide path 20, the leading end of the film F is advanced rightwardly downward in FIG. 1 or 2 by the curl of the film itself and by being depressed by the roller 21, further passed along the inner surface of the body wall 8a and the guide plate 22 to move around the spool 4 by approximately one turn and pressed against the spool 4 by the guide roller 26. The leading end of the film F thereafter underlaps a different portion of the film F subsequently guided into the spool chamber 2 and is tightly wound on the spool 4 by the friction between the film F and the spool 4.

A second film detecting lever 30 has a pivot 30a rotatably supported by an inner upper portion of the body 8, an operating arm 30b biased clockwise by the resiliency of a movable contact member 32a of a switch 32, and a detecting arm 30c the forward end of which is fitted in a small-diameter portion 4a of the spool 4 formed at an upper portion thereof. The switch 32 comprises the movable contact piece 32a and fixed contact pieces 32b, 32c arranged on the opposite sides of the piece 32a. With its resiliency, the movable piece 32a usually bears against the fixed piece 32b. When the full-width forward end portion 311 of the film F reaches the detecting arm 30c after turning around the spool 4 by approximately one turn as seen in FIG. 2, the arm 30c is turned counterclockwise and forced out from the small-diameter spool portion 4a by the film end portion 31 against the bias force of the movable contact piece 32a. Consequently the movable piece 32a is pushed out of contact with the fixed piece 32b and brought into contact with the fixed piece 32c by the operating arm 30b of the detecting lever 30.

Figure 4:
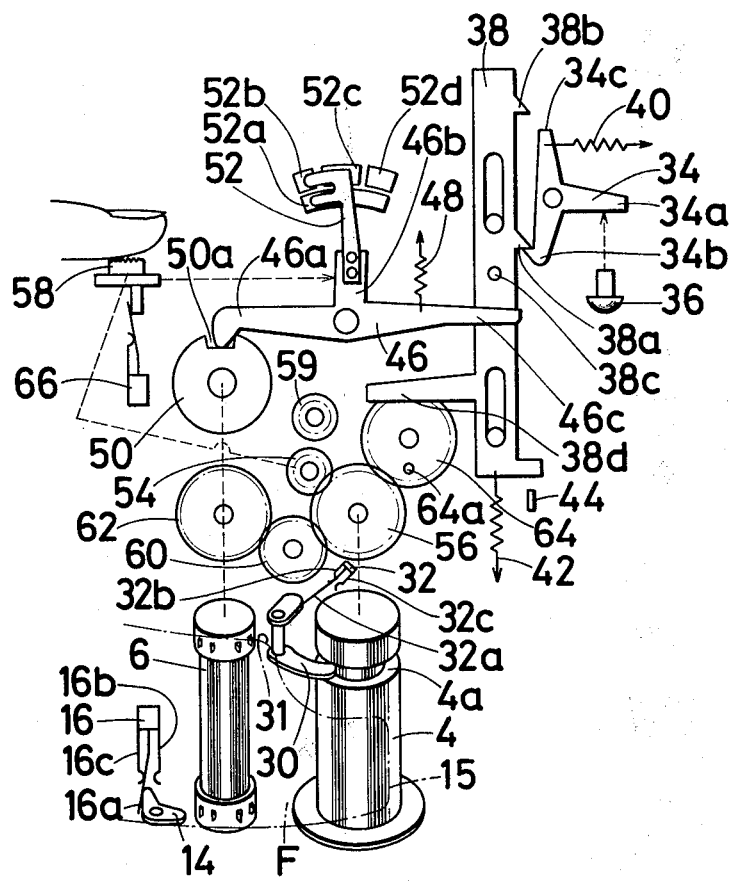
FIG. 4 is a fragmentary diagram showing a camera having the embodiment incorporated therein.

FIG. 4 is a diagram showing a power transmission mechanism, a release mechanism, etc. A latch lever 34 has a release arm 34a movable counterclockwise by a release button 36 when the button is depressed, a first latch arm 34b engageable with a first projection 38a of a setting bar 38 when the bar 38 is in its cocked position, and a second latch arm 34c engageable with a second projection 38b of the bar 38 while the release button 36 is depressed. The latch lever 34 is biased clockwise by a spring 40.

The setting bar 38, which is vertically slidable in FIG. 4, is biased downward by a spring 42. When the bar 38 is in its cocked position, the first projection 38a is held engaged by the first latch arm 34b of the latch lever 34. When the release button 36 is depressed in this state, the latch lever 34 is pushed counterclockwise to release the first projection 38a from the first latch arm 34b, permitting the setting bar 38 to move to a first release position in which the second projection 38b is engaged by the second latch arm 34c.

When the release button 36 is thereafter freed, the latch lever 34 is turned clockwise by the force of the spring 40 to disengage the second projection 38b from the second latch arm 34c, permitting the setting bar 38 to further move to a second release position below the first release position.

A shutter release lever 44 is positioned in the path of movement of the setting bar 38. With the movement of the setting bar 38 to the first release position, the lower end of the bar 38 pushes the lever 44 downward and operates an unillustrated shutter mechanism to make an exposure.

A switch lever 46 has a first arm 46a, second arm 46b and third arm 46c and is biased by a spring 48 counterclockwise in FIG. 4. The first arm 46a bears against an end portion of a circular index plate 50 formed with a cutout 50a and rotatable with the sprocket 6. The forward end of the first arm 46a is engaged in the cutout 50a in a cocked state. A switch 52 is attached to the second arm 46b of the switch lever and includes a contact piece 52a which is electrically connectable to a contact piece 52b, 52c or 52d. The third arm 46c extends into the path of movement of a pin 38c mounted on the setting bar 38.

When the switch lever 46 is in its cocked state, the forward end of the first arm 46a fits in the cutout 50a of the index plate 50 to cause the switch 52 to electrically connect the contact piece 52a to the contact piece 52b. When the setting bar 38 moves to the second release position, the third arm 46c of the switch lever is pushed clockwise by the pin 38c on the bar 38. Consequently the forward end of the first arm 46a moves out from the cutout 50a, and the switch 52 on the second arm 46b disconnects the contact piece 52a from the contact piece 52 and connects the piece 52 to the piece 52c.

A drive gear 54 is in mesh with a gear 56 attached to the spool 4 and is rotated clockwise by a motor not shown in FIG. 4. The drive gear 54 is coupled to a rewinding button 58, which, when manipulated, moves the gear 54 away from the gear 56 into engagement with an rewinding gear 59.

The gear 56 is coupled by an idler gear 60 to a gear 62 attached to the sprocket 6. When the motor rotates the drive gear 54 in mesh with the gear 56, the sprocket 6 and the spool 4 rotate in a direction to wind up the film. The gear 56 is also in mesh with a cocking gear 64 which has a cocking pin 64a engageable with a cocking arm 38d of the setting bar 38. With the rotation of the cocking gear 64, the pin 64a pushes the cocking arm 38d of the setting bar 38 upward. As a result, the setting bar 38 is pushed up against the action of the spring 42 to its cocked position in which the first latch arm 34b of the latch lever 34 engages the first projection 38a of the bar 38.

The rewinding button 58, which is coupled to the driven gear 54 as already stated, is engageable with a switch 66 and is further adapted to push the switch lever 46 through unillustrated coupling means. The switch 66 is adapted to spontaneously open when left free. When the rewinding button 58 is in the position shown in FIG. 4, the drive gear 54 is in mesh with the gear 56, while the switch 66 is closed. Further, the unillustrated coupling means is so positioned as to be out of engagement with the switch lever 46. When the rewinding button 58 is moved rightward for rewinding the film, the drive gear 54 is disengaged from the gear 56 and moved into meshing engagement with the gear 59 which is coupled to an unillustrated rewinding mechanism, the switch 66 is opened, and the switch lever 46 is pushed to disconnect the contact piece 52a of the switch 52 from the contact piece 52b and connect the piece 52a to the piece 52d. At the same time, the forward end of the first arm 46a of the switch lever 46 is moved out from the cutout 50a of the index plate 50.

Figure 5:
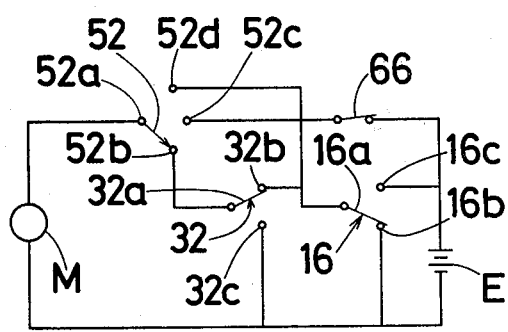
FIG. 5 is a diagram showing a motor drive circuit included in the embodiment.

FIG. 5 shows a motor drive circuit including a motor M and a power supply E. The contact piece 52b, the switch 32 and the switch 16 are connected together in series. The contact piece 52c is connected in series with the switch 66. The contact piece 52d is connected in series with the switch 16. These three series circuits are individually adapted to electrically connect the power supply E to the motor M.

The above embodiment operates in the following manner.

The operation for autoloading a film will be described first. The film cartridge is placed in position in engagement with an unillustrated rewinding shaft, and the leading end 15 of the film is pulled out from the cartridge and inserted into the inlet 12, whereupon the first detecting lever 14 brings the movable contact piece 16a of the switch into contact with the contact piece 16c. Since the contact pieces 52a and 52b of the switch 52, as well as the contact pieces 32a and 32b of the switch 32, are electrically connected together before the film loading, the motor drive circuit is consequently closed to drive the motor M, whereby the sprocket 6 and the spool are rotated clockwise in FIG. 1. When the film is further inserted, perforations of the film are engaged with teeth 6a of the sprocket 6, with the result that the film is automatically transported.

Subsequently the full-width forward end portion 31 of the film F moves around the spool 4 by approximately one turn and comes into engagement with the second film detecting lever 30 as seen in FIG. 2, whereupon the movable contact piece 32a of the switch 32 moves away from the contact piece 32b into contact with the piece 32c. This opens the motor drive circuit to stop the motor M and the film. Since the interruption of the transport of the film indicates that the film F has been wound around the spool 4, the user may then close the unillustrated camera back for the subsequent photographic procedure.

The camera may be so adapted that upon the closing of the camera back, the film is automatically transported to the exposure position for the first frame of the film by an unillustrated idle transport mechanism.

The film is automatically wound up in the following manner for taking photographs. When the release button 36 is freed from depression after maing an exposure, the setting bar 38 moves to the second release position, causing the pin 38c to push the switch lever 46 clockwise. Consequently the forward end of the first arm 46a of the switch lever is moved out from the cutout 50a of the index plate 50, and the contact piece 52a of the switch 52 is disconnected from the contact piece 52b and connected to the contact piece 52c.

With the piece 52a connected to the piece 52c, the motor drive circuit is closed since the switch 66 is already closed. The motor M is driven to rotate the spool 4 and the sprocket 6 and wind up the film. On the other hand, the unillustrated shutter mechanism is cocked, and the setting bar 38 is pushed to its cocked position by the cocking pin 64a. Although the third arm 46c of the switch lever is freed from the depression of the pin 38c on the bar 38 at this time, the switch lever 46 remains in the clockwise turned position with the contact piece 52a held connected to the contact piece 52c, because the forward end of the first arm 46a of the switch lever is bearing on an end portion of the index plate 50.

When the index plate 50 rotates by approximately one turn, the end of the first arm 46a again fits in the cutout 50a of the plate 50, permitting the switch lever 46 to turn counterclockwise, whereby the contact piece 52a of the switch 52 is disconnected from the piece 52c and connected to the piece 52b. This opens the motor drive circuit to stop the motor M, and the film is completely wound up the one frame.

When the rewinding button 58 is moved rightward to rewind the film, the drive gear 54 is coupled to the unillustrated film rewinding mechanism as already stated. At the same time, the switch 66 is opened, and the contact piece 52a of the switch 52 is connected to the contact piece 52d. The motor drive circuit is closed by the pieces 52a and 52d thus connected and the pieces 16a and 16c of the switch 16 which have already been closed. The motor M is therefore energized to start rewinding the film.

When the film is almost completely rewound and the leading end of the film F is withdrawn from the inlet 12, the first detecting lever 14 turns to move the movable contact piece 16a of the switch 16 away from the contact piece 16c into contact with the contact piece 16b. This opens the motor drive circuit to stop the motor M and complete the rewinding operation.

The transport member for transporting the film into the spool chamber may be a roller rotatable by the motor.

Figure 6:
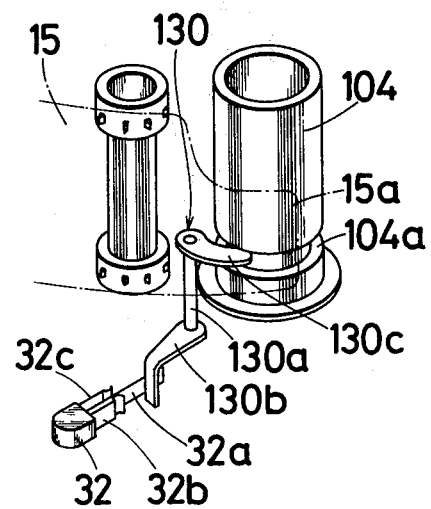
FIG. 6 is a fragmentary perspective view showing another embodiment of the invention.

FIG. 6 shows a modified second detecting member 130. A small-diameter portion 104a is formed in a lower portion of a spool 104. The second detecting lever 130 is turnable about a pivot 130a and has a detecting arm 130c opposed to the small-diameter portion 104a and adapted to contact the leading end 15a of a film 15. The lever 130 has an operating arm 130b bearing on the movable contact piece 32a of the switch 32 and biased counterclockwise by the resiliency of the movable piece 32a.

In the absence of a film, the forward end of the detecting arm 130 fits in the small-diameter portion 104a, with the movable contact piece 32a in contact with the fixed contact piece 32b. When the leading end 15a of the film comes into engagement with the detecting arm 130c after advancing around the spool by approximately one turn, the detecting arm 130c is turned clockwise and pushed out from the small-diameter spool portion 104a against the force of the movable contact piece 32a. Consequently the movable contact piece 32a is pushed away from the fixed contact piece 32b into contact with the fixed contact piece 32c by the operating arm 130b. With the exception of this feature, the emobidment of FIG. 6 has the same construction as the first embodiment.

When the detecting arm 130c of the second detecting lever 130 is disposed at a location opposed to the lower portion of the spool 104 in this way, the second detecting lever 130 functions upon detecting the leading end 15a of the film and therefore stops the motor with earlier timing than is the case with the first embodiment. This greatly reduces the length of film to be pulled out from the cartridge and exposed to light for loading before the camera back is closed.

Briefly the autoloading apparatus of this invention comprises a first detecting member for energizing a drive motor upon detecting the insertion of a film into a film inlet, and a second detecting member for stopping the drive motor upon detecting the winding of the film on a take-up spool. Accordingly the apparatus automatically starts to wind up the film merely when the film is inserted into the inlet and automatically stops the operation when the leading end portion of the film has been wound up on the spool. This enables the user to close the camera back after recognizing that the film has been properly wound on the spool, further reducing the amount of film wasted.

Moreover the camera back is easily closable since it is closed after the film has been tensioned by winding on the spool with the cartridge properly placed in position.

What is claimed is:

1. An autoloading apparatus comprising:
a spool chamber having a film inlet,
a take-up spool accommodated in the spool chamber for winding a film thereon,
a film transport member for transporting the film to the take-up spool after the film is inserted into the film inlet of the spool chamber, a motor for driving the take-up spool and the transport member, a motor drive circuit for energizing the motor, first detecting means for detecting the insertion of the film into the film inlet, associated with the motor drive circuit for causing the motor drive circuit to energize the motor upon the insertion of the film into the film inlet, and second detecting means for detecting that the film has been wound on the take-up spool, associated with the motor drive circuit for causing the motor drive circuit to de-energize the motor upon the winding of the film on the take-up spool.

2. An autoloading apparatus as defined in claim 1 wherein the first detecting means includes a first detecting member movable between an inoperative position wherein it extends into the film inlet and an operative position wherein it is pushed away from the inoperative position by the film inserted in the film inlet, and the motor drive circuit is arranged to energize the motor in response to the movement of the first detecting member to the operative position.

3. An autoloading apparatus as defined in claim 2 wherein the take-up spool is formed with a film winding portion on which the film is to be wound and a small-diameter portion the diameter of which is smaller than that of the film winding portion, and the second detecting means includes a second detecting member movable between an inoperative position wherein it drops onto the small-diameter portion and an operative position wherein it is lifted from the small-diameter portion by the film wound on the take-up spool, and the motor drive circuit is arranged to de-energize the motor in response to the movement of the second detecting member to the operative position.

4. An autoloading apparatus as defined in claim 3, wherein the motor drive circuit has a first switch transferable from an inoperative state into an operative state in operative relation with the movement of the first detecting member to its operative position and a second switch transferable from an operative state into an inoperative state in operative relation with the movement of the second detecting member to its operative position, and the motor is energized when the first switch and the second switch are both in the operative state.

5. An autoloading apparatus as defined in claim 1 wherein the film transport member comprises a sprocket.

6. An autoloading apparatus as defined in claim 1 wherein the film transport member comprises a roller.

* * * * *